Figure 1:
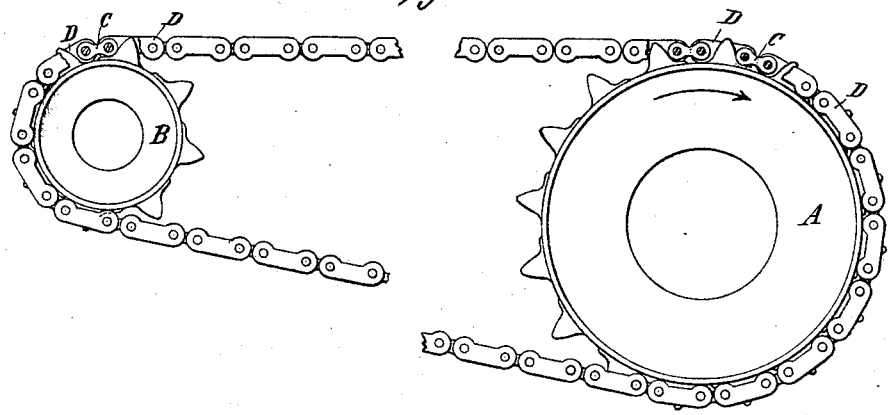

No. 609,927. Patented Aug. 30, 1898.
F. E. BALDWIN.
SPROCKET CHAIN GEARING.
(Application filed Dec. 28, 1897.)
(No Model.)

Witnesses:
Raphaël Netter
Benjamin Miller

Frederic E. Baldwin, Inventor
by Ken. Curtis & Page
Att'ys.

THE NORRIS PETERS CO., PHOTO-LITHO., WASHINGTON, D. C.

UNITED STATES PATENT OFFICE.

FREDERIC E. BALDWIN, OF NEW YORK, N. Y.

SPROCKET-CHAIN GEARING.

SPECIFICATION forming part of Letters Patent No. 609,927, dated August 30, 1898.

Application filed December 28, 1897. Serial No. 663,867. (No model.)

*To all whom it may concern:*

Be it known that I, FREDERIC E. BALDWIN, a citizen of the United States, residing at New York, (New Brighton,) in the county of Richmond and State of New York, have invented certain new and useful Improvements in Sprocket-and-Chain Gearing, of which the following is a specification, reference being had to the drawings accompanying and forming a part of the same.

For a better understanding of the nature of the invention which forms the subject of my present application a brief review of certain recent improvements in sprocket-and-chain gearing and of the considerations which have led to them will be given.

In the ordinary sprocket-and-chain gearing as heretofore very generally used in bicycles the center solid or generally the driving links of the chain when the machine was propelled forward by the pedals fulcrumed on the periphery of the sprockets at points immediately adjacent to the idle faces of the teeth. This fulcruming of the center links was the cause of the principal wear on the sprocket-wheels and resulted in great loss by friction. Several ways of obviating this objection were devised, one of which was to provide supports for the connecting or side links at or near the points where the driving or center links would otherwise bear and rub or grind on the sprocket, and such supports held the said center or driving links out of contact with the wheel at such points. These supports for the connecting or side links were produced by projections either on the links themselves or on the wheel under them or by applying to the wheel or forming it with a flange or flanges and cutting away such flanges at points where the connecting-links themselves would otherwise fulcrum; but this plan involved the cutting out of portions of the flanges, which was a by no means inconsiderable item of expense and was an objection to this form of sprocket. One of the objects of my present invention is to accomplish the same result, but in an easier and cheaper manner. Again, manufacturers of sprocket-and-chain gearing for bicycles, I believe, invariably proportion the parts of a chain which is composed of center or driving links and side or connecting links so that a sprocket-tooth just fits into the space between the ends of two adjacent driving-links. At least no material space is intentionally left or play provided for between the teeth and the ends of adjacent driving or solid links, so that the chain as a whole has no appreciable range or circumferential movement relatively to the sprocket-wheels unless as the result of chance or wear. It is, however, true of nearly all sprocket-and-chain gears, whether specially devised for preventing rubbing friction between the chain and the wheels or not, that as much friction and consequent wear are caused by a reversal of the direction of the applied force—that is, by back-pedaling—as in forward propulsion. The friction loss in itself may not be objectionable. In fact, it may be advantageous in so far as it assists in retarding the forward movement of the machine as when running on a downgrade; but its effects in wear are or may be serious, inasmuch as the points of wear are those on which the links rest when power is applied in forward driving and where any change in the configuration of the sprocket destroys to the greatest extent the pitch-line.

Another object of my invention is to provide for a certain circumferential displacement of the chain relatively to the sprocket-wheels constructed in accordance with my invention, so that the points of rubbing friction between the chain and wheels during a reversal of the applied force shall be sufficiently removed from the points of contact between the sprocket and chain in direct propulsion to prevent wear and injury to the sprockets at the latter points.

I shall now describe the details of my invention by reference to the accompanying drawings.

Figure 2:
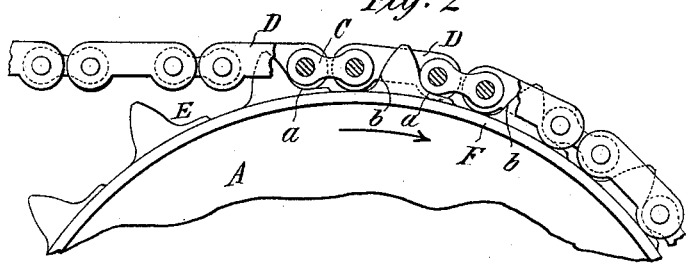
Figure 3:
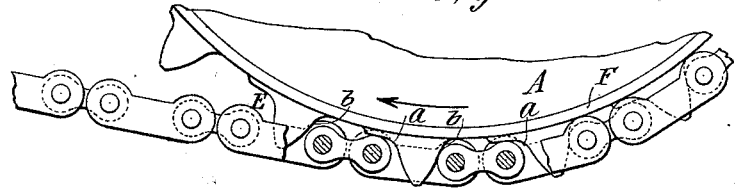
Figure 4:
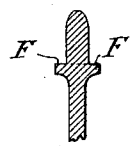

Figure 1 is a side view of my improved sprocket-and-chain gear. Fig. 2 is an enlarged view of a portion of the driving-sprocket, partly in section. Fig. 3 is a view of the same, showing the relation of the sprocket and chain when the direction of applied power is reversed. Fig. 4 is a sectional view of a portion of the sprocket near its periphery.

A is the driving and B the driven sprocket of a bicycle chain-gear, the chain being composed of center solid or driving links C and side open or connecting links D.

The sprocket-wheels, instead of being cut in the usual way, are cut or formed with slight peripheral projections E adjacent to the working faces of the teeth, having regard to the direction of applied force. These projections form elevated seats or supports for the ends of the solid or driving links. On one or both sides of each wheel is a concentric flange F, the diameter of which is equal to or it may be slightly greater than that of a circle drawn through the lower portions of the surfaces of the interdental spaces. The proportions and relations of these parts are such that the ends of the driving-links which rest upon the elevated portions of the interdental spaces afford pivotal supports for the connecting-links at a sufficient elevation to prevent the ends of the said connecting-links from turning in contact with the flanges and also that the ends of the connecting-links adjacent to the idle faces of the teeth shall rest upon the flanges and afford pivotal supports for the ends of the driving-links pivoted to them and so prevent the latter from turning in contact with the periphery of the sprocket. In order to secure the necessary clearance in the latter case, the driving-links are preferably made narrower than the faces of the connecting-links at their ends. By this construction the flanges which form the supports for the connecting-links, however made and applied, require no special cutting, the necessary clearance under the turning ends of the connecting-links being afforded by the elevated seats for the driving-links to which they are pivoted.

In order to more fully illustrate the nature and purpose of the construction above described, let it be assumed that the direction of applied force is from left to right along the upper fold of the chain. It will be observed that the center solid or driving links, which are marked C, bear upon both sprockets at the points $a$ on the raised portions of the interdental spaces. The ends of the side or connecting links D, which are pivoted to these supported ends of the links C, turn about these pivotal connections and would wear depressions in the flanges were they not held up out of contact therewith by the raised supports. On the other hand, the ends of the side or connecting links D adjacent to the idle faces of the teeth have no tendency to turn with respect to the periphery of the sprocket, or, in other words, to fulcrum thereon; but the ends of the solid or driving links which are pivoted to them have such a tendency, and if allowed to rest in contact with the periphery of the sprocket would wear indentations therein. To prevent this, the flanges are provided to afford seats for the ends of the side links, and these support the ends of the center links out of contact with the wheel. In such a sprocket-and-chain gear there are no points on the sprocket-wheels where the chain-links slide or rub in the forward propulsion of the wheels and consequently no points of wear due to rubbing friction.

An examination of the sprocket will show that if when an ordinary chain is used with it the direction of applied power be reversed, as would be the case in back-pedaling, the means for preventing rubbing friction and wear are no longer effective and that depressions will be worn in the sprocket at the points indicated by $a\ a$. The pitch of the sprocket will thus be varied and the efficiency of the driving-gear impaired. To obviate this, I so proportion the chain and sprocket as to allow a certain circumferential movement of the chain relatively to the sprocket—that is to say, I increase the length of the connecting-links or decrease that of the driving-links or generally pivot the connecting and driving links in such manner that the spaces between the ends of adjacent driving-links shall be greater than the width of the teeth along the line of the chain. As a result of this when the direction of applied force is reversed the whole chain slips back, bringing the ends of the links which now turn in contact with the wheel over points $b\ b$, where the wear will not affect or interfere with the operation of the gear in forward propulsion.

Having now described my invention, what I claim is—

1. The combination with a sprocket-wheel and a sprocket-chain composed of connecting and driving links, the driving-links occupying the interdental spaces on the wheel, the wheel being formed or provided with raised seats or supports for the ends of the driving-links immediately adjacent to the working faces of the teeth and seats or supports on the sides of the wheel for the connecting-links, adjacent to the idle faces of the teeth which maintain the driving-links out of contact with the wheel at the points of rubbing friction, as set forth.

2. A sprocket-wheel having raised seats or supports for the ends of the driving-links immediately adjacent to the working faces of the teeth, and formed or provided with side flanges of approximately the diameter of the lower portions of the interdental spaces on the periphery of the wheel and affording a support for the ends of the connecting-links adjacent to the idle faces of the teeth, as set forth.

3. The combination with a sprocket-wheel and a sprocket-chain composed of driving and connecting links, the spaces in the chain between the ends of adjacent driving-links being greater than the width of the teeth along the line of the chain, the wheel being formed or provided with raised seats or supports for the ends of the driving-links immediately adjacent to the working faces of the teeth, and seats or supports for the connecting-links adjacent to the idle faces of the teeth which maintain the chain-links out of contact with the wheel at the points of rubbing friction, as set forth.

FREDERIC E. BALDWIN.

Witnesses:
M. LAWSON DYER,
EDWIN B. HOPKINSON.